United States Patent
Mizutani (10) Patent No.: US 10,008,714 B2
(45) Date of Patent: Jun. 26, 2018

(54) ANODE MIXTURE AND ALL SOLID BATTERY

(71) Applicant: Toyota Jidosha Kabushiki Kaisha, Toyota-shi, Aichi-ken (JP)

(72) Inventor: Satoshi Mizutani, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days. days.

(21) Appl. No.: 15/214,824

(22) Filed: Jul. 20, 2016

(65) Prior Publication Data

US 2017/0033352 A1 Feb. 2, 2017

(30) Foreign Application Priority Data

Jul. 27, 2015 (JP) .................................. 2015-147814

(51) Int. Cl.
*H01M 4/36* (2006.01)
*H01M 4/134* (2010.01)
(Continued)

(52) U.S. Cl.
CPC ............ *H01M 4/364* (2013.01); *H01M 4/366* (2013.01); *H01M 4/386* (2013.01); *H01M 4/387* (2013.01); *H01M 4/587* (2013.01); *H01M 4/625* (2013.01); *H01M 4/628* (2013.01); *H01M 10/0525* (2013.01); *H01M 10/0562* (2013.01);
(Continued)

(58) Field of Classification Search
None
See application file for complete search history.

(56) References Cited

U.S. PATENT DOCUMENTS

2003/0148185 A1* 8/2003 Kusumoto .............. H01M 4/13
429/233
2009/0297951 A1 12/2009 Katsura et al.
(Continued)

FOREIGN PATENT DOCUMENTS

JP H11096993 A 4/1999
JP 2010-153346 A 7/2010
(Continued)

OTHER PUBLICATIONS

Chai et al. "Carboxyl methylcellulose solid polymer electrolytes: Ionic conductivity and dielectric study"; Journal of Current Engineering Research, vol. 1, Issue 2, Nov.-Dec. 2011, p. 23-27 ISSN No. 2250-2637).*

*Primary Examiner* — Wojciech Haske
(74) *Attorney, Agent, or Firm* — Dinsmore & Shohl LLP (57) ABSTRACT

An anode mixture with high energy density and capability of restraining the decrease in capacity maintaining rate due to the expansion and contraction of an anode active material is provided. The anode mixture includes a first anode active material, a second active material and a solid electrolyte material. The first anode active material is an active material having a carbon matrix and a particle containing Si or Sn dispersed into the carbon matrix. An average particle diameter of the first anode active material is 15 μm or less and a content of the carbon matrix in the first anode active material is 15% by weight or more and 65% by weight or less. A content of the particle in the first anode active material is 35% by weight or more and 85% by weight or less and has an average particle diameter of 11 nm or less.

5 Claims, 3 Drawing Sheets (51) Int. Cl.
  *H01M 4/38*      (2006.01)
  *H01M 4/587*     (2010.01)
  *H01M 10/0525*   (2010.01)
  *H01M 10/0562*   (2010.01)
  *H01M 4/62*      (2006.01)
  *H01M 4/133*     (2010.01)

(52) U.S. Cl.
  CPC ............ *H01M 4/133* (2013.01); *H01M 4/134* (2013.01); *H01M 2300/0068* (2013.01)

(56) References Cited

U.S. PATENT DOCUMENTS

2010/0297479 A1\* 11/2010 Tsuchida ................. H01M 6/18
                                                     429/49
2014/0087233 A1\* 3/2014 Hong ................... H01M 2/1686
                                                     429/144
2014/0287315 A1\* 9/2014 Troegel ............... H01M 4/0421
                                                     429/231.8

FOREIGN PATENT DOCUMENTS

| JP | 2013239267 A | 11/2013 |
|----|--------------|---------|
| JP | 2014022319 A | 2/2014 |
| JP | 2014-183043 A | 9/2014 |
| JP | 2014192093 A | 10/2014 |

\* cited by examiner

ANODE MIXTURE AND ALL SOLID BATTERY

CROSS-REFERENCE TO RELATED APPLICATION

This application claims priority to Japanese Patent Application No. 2015-147814 filed on Jul. 27, 2015, the entire contents of which are hereby incorporated by reference into the present application.

TECHNICAL FIELD

The present disclosure relates to an anode mixture with high energy density and capability of restraining the decrease in capacity maintaining rate due to the expansion and contraction of an anode active material.

BACKGROUND ART

In accordance with a rapid spread of information relevant apparatuses and communication apparatuses such as personal computers, video cameras and portable telephones in recent years, the development of a battery to be utilized as a power source thereof has been emphasized. Also, in the fields other than information relevant apparatuses and communication apparatuses, the development of a lithium ion battery used for an electric automobile or a hybrid automobile has been advanced in the automobile industry, for example.

Liquid electrolytes containing flammable organic solvents are presently used in commercialized lithium batteries, so that installation of a safety device for restraining temperature rise during a short circuit and a structure for preventing the short circuit are necessary. On the contrary, an all-solid lithium battery that replaces the liquid electrolyte with a solid electrolyte layer is conceived to simplify the safety device, reduce production cost and increase productivity since a flammable organic solvent would not be used in the battery. Further, an all-solid battery in which a sulfide solid electrolyte material is used has an advantage of being excellent in lithium ion conductivity among solid batteries.

With regard to such all-solid batteries, various research focusing on an anode mixture has been conducted for the purpose of improving battery performance. For example, in Patent Literature 1 (Japanese Patent Application Laid-Open No. 2014-192093), improvement of energy density and cycle feature by using a particle containing a silicon (Si) element or a tin (Sn) element, a conductive particle, and a solid electrolyte material for an anode mixture is suggested.

SUMMARY

As suggested in Patent Literature 1, improvement of the energy density is possible when a particle that contains Si or Sn is used as an anode active material in an anode mixture. On the other hand, in the case of using the particle that contains Si or Sn as an anode active material in the anode mixture, the particle repeatedly expands and contacts due to the intercalation and desorption of a lithium ion, and a volume change in the anode active material is caused thereby. When the volume change in the anode active material occurs, there is a problem that the contact between the anode active material and the solid electrolyte material in the anode mixture cannot be maintained, and thus the lithium ion conduction path is shredded. As a result, the problem of decrease in the capacity maintaining rate arises.

A main object of the present disclosure is to prove an anode mixture with high energy density and capability of restraining the decrease in the capacity maintaining rate due to the expansion and contraction of an anode active material.

To solve the above problem, the present disclosure provides an anode mixture comprising a first anode active material, a second anode active material, and a solid electrolyte material, wherein the first anode active material is an active material having a carbon matrix and a particle containing Si or Sn dispersed into the carbon matrix; an average particle diameter of the first anode active material is 15 μm or less; a content of the carbon matrix in the first anode active material is 15% by weight or more and 65% by weight or less; a content of the particle in the first anode active material is 35% by weight or more and 85% by weight or less; an average particle diameter of the particle is 11 nm or less; the second anode active material is a carbon material; and a ratio (in percent) of the first anode active material relative to a total of the first anode active material and the second anode active material is 20% by weight or more and 90% by weight or less.

The present disclosure allows an anode mixture with high energy density and capability of restraining the decrease in the capacity maintaining rate due to the expansion and contraction of the anode active material.

In the present disclosure, it is preferable that a surface of the first anode active material is coated with a lithium oxide.

The present disclosure provides an all solid battery comprising an anode active material layer including the anode mixture described above.

The present disclosure allows an all solid battery with high energy density and capability of restraining the decrease in the capacity maintaining rate due to the expansion and contraction of the anode active material.

The present disclosure provides an anode mixture with high energy density and capability of restraining the decrease in the capacity maintaining rate due to the expansion and contraction of an anode active material.

DETAILED DESCRIPTION

An anode mixture and an all solid battery of the present disclosure are hereinafter described in detail.

A. Anode Mixture

Figure 1:
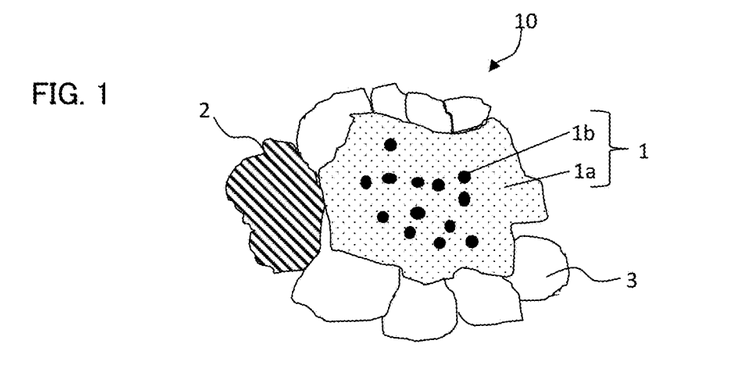
FIG. 1 is a schematic cross-sectional view illustrating an example of the anode mixture of the present disclosure.

FIG. 1 is a schematic cross-sectional view illustrating an example of the anode mixture of the present disclosure. In embodiments, an anode mixture 10 has a first anode active material 1, a second anode active material 2, and a solid electrolyte material 3. Also, the first anode active material 1 is an active material having a carbon matrix 1a and a particle 1b containing Si or Sn dispersed into the carbon matrix 1a. Further, the anode mixture 10 of the present disclosure features the configuration wherein an average particle diameter of the first anode active material 1 is 15 μm or less, a content of the carbon matrix 1a in the first anode active material 1 is 15% by weight or more and 65% by weight or less, a content of the particle 1b in the first anode active material 1 is 35% by weight or more and 85% by weight or less, and an average particle diameter of the particle 1b is 11 nm or less. Furthermore, the anode mixture 10 of the present disclosure features the configuration wherein the second anode active material 2 is a carbon material, and a ratio (in percent) of the first anode active material 1 relative to a total of the first anode active material 1 and the second anode active material 2 is 20% by weight or more and 90% by weight or less.

According to the present disclosure, the first anode active material included in the anode mixture is an active material that has a particle containing Si or Sn so that it is possible to achieve high energy density. On the other hand, as in Patent Literature 1 for example, there is a problem in that the capacity maintaining rate decreases when an anode active material contains Si or Sn. It is conceived that the problem occurs for the reasons such that the condition in which the anode active material and the solid electrolyte material are in contact with each other at the interface cannot be maintained due to the repeated expansion and contraction of the anode active material associated with the intercalation and desorption of a lithium ion, and thus the lithium ion conduction path is disrupted. Incidentally, the volume expansion ratio of a simple substance of Si is 4.2 times at the maximum, the volume expansion ratio of a simple substance of Sn is 3.6 times at the maximum, both of which have a similar volume expansion ratio due to the intercalation and desorption of a lithium ion.

To solve the problem, the present disclosure provides the anode mixture that includes the first anode active material having a carbon matrix and a particle containing Si or Sn dispersed into the carbon matrix, the second anode active material being a carbon material, and the solid electrolyte material, so that the decrease in capacity maintaining rate due to the expansion and contraction of the anode active material associated with the intercalation and desorption of a lithium ion may be restrained, and thus the condition in which the anode active material and the solid electrolyte material are in contact with each other at the interface is maintained and the lithium ion conduction path may be maintained.

It is presumed that the effect of the present disclosure is caused by reasons such as the following. Namely, it is presumed that the effect is caused by the average particle diameter of the particle being within the specific range or less and thus the expansion and contraction volume of the particle associated with the intercalation and desorption of a lithium ion may be restrained. Also, it is presumed that the effect is caused by the anode mixture in the present disclosure being capable of allowing the expansion and contraction of the particle associated with the intercalation and desorption of a lithium ion to be absorbed in the carbon matrix which has comparatively low expansion and contraction rate by containing the first anode active material in which the particle is dispersed into the carbon matrix, and thus the expansion and contraction rate as the first anode active material may be restrained. Further, it is presumed that the effect is caused by the average particle diameter of the first anode active material being within the specific range or less and thus the expansion and contraction volume of the first anode active material may be restrained. Furthermore, it is presumed that the effect is caused by the anode mixture in the present disclosure containing the second anode active material, which is a carbon material with comparatively low expansion and contraction rate so that the expansion and contraction of the first anode active material may be absorbed by the second anode active material, and thus the expansion and contraction volume of the anode mixture may be restrained.

Also, in the present disclosure, from the reasons described above, it is conceived that the effect that the cell characteristic is improved may be obtained for the reason that the condition in which the anode active material and the solid electrolyte material are in contact with each other at the interface may be maintained and thus the lithium ion conduction path may be secured.

Each of the first anode active material, the second anode active material, and the solid electrolyte material, contained in the anode mixture of the present disclosure is hereinafter explained.

1. First Anode Active Material

In embodiments, the first anode active material is an active material having a carbon matrix and a particle containing a Si element or a Sn element dispersed into the carbon matrix.

The average particle diameter of the first anode active material in the present disclosure is usually 15 micrometers (μm) or less, preferably 12 μm or less, and more preferably 11 μm or less. Also, the average particle diameter of the first anode active material in the present disclosure is preferably 1 μm or more, preferably 2 μm or more. The average particle diameter of the first anode active material is within the above noted range so that the expansion and contraction volume of the first anode active material may be decreased, and thus the contact between the anode active material layer constituted with the anode mixture and the solid electrolyte layer at the interface may be easily maintained. Consequently, the high energy density and the capacity maintaining rate of a battery may be achieved.

Also, examples of the methods for measuring the average particle diameter of the first anode active material may include a method of calculation by a laser diffraction type particle diameter analyzer, and a median diameter ($D_{50}$) may be used. Further, the average particle diameter of the first anode active material may be controlled by adjusting time for performing a mechanical milling such as ball mill, for example. Incidentally, in the case the surface of the first anode active material is coated with a lithium oxide, the average particle diameter of the first anode active material described above refers to the diameter with the coating.

The carbon matrix and the particle contained in the first anode active material are hereinafter explained.

(1) Carbon Matrix

In embodiments, the carbon matrix is a material that keeps a particle containing Si or Sn, in dispersed state.

In the present disclosure, the content of the carbon matrix in the first anode active material is usually 15% by weight or more, preferably 20% by weight or more. Also, the content of the carbon matrix is usually 65% by weight or less, preferably 50% by weight or less. The content of the carbon matrix in the first anode active material is within the noted range so that it is possible to sufficiently absorb the expansion and contraction of the particle containing Si or Sn associated with the intercalation and desorption of a lithium ion. Consequently, decrease in capacity maintaining rate due to the expansion and contraction of the anode active material may be restrained.

The carbon matrix in the present disclosure is not particularly limited to a matrix constituted with a carbon material. Here, 'constituted with a carbon material' indicates that the content of the carbon material in the carbon matrix is 90% by weight or more. In embodiments, the content of the carbon material in the carbon matrix is preferably 92% by weight or more, and more preferably 95% by weight or more. The carbon material to be used in such a carbon matrix may be crystalline or amorphous, for example. Also, specific examples of the carbon materials may include carbon black such as acetylene black and Ketjen black, carbon fiber such as vapor-phase carbon fiber, and graphite. Carbon black is preferably used, and acetylene black is more preferably used.

In the carbon matrix in the present disclosure, the above described material may be present as one mixture or in two or more mixtures. In the case of using the above described materials using two or more mixtures, two or more kinds of the materials with different expansion and contraction rates are preferably used. The expansion and contraction rate of the carbon matrix may be restrained so that contact with the solid electrolyte material may be maintained, and thus it is possible to secure a lithium ion conduction path in the anode mixture. Also, the expansion and contraction volume of the whole anode electrode may be restrained and thus it is possible to secure a lithium ion conduction path.

A method of producing the carbon matrix in the present disclosure is not particularly limited if the method allows the carbon matrix to contain a desired particle diameter and the particle to be obtained, but the methods such as mechanical compounding processing may be used. In specific, examples of the methods may include a mechanical milling method such as ball mill, turbo mill, mechano-fusion, and disc mill, with a ball mill preferable.

(2) Particle Containing Si or Sn

The particle in the present disclosure is a material that is included in the first anode active material, contains Si or Sn, and is kept in dispersed condition in the carbon matrix.

The particle in the present disclosure is not particularly limited if the particle contains Si or Sn. For example, the particle may be a simple substance of Si or Sn, or may be contained in an alloy with a substance such as iron, cobalt, nickel, titanium and chrome.

In embodiments, the content of the particle in the first anode active material is usually 35% by weight or more, preferably 40% by weight or more, and more preferably 50% by weight or more. Also, in the present disclosure, the content of the particle in the first anode active material is usually 85% by weight or less, preferably 80% by weight or less, and more preferably 70% by weight or less. The content of the particle in the first anode active material is within the above noted range and thus the improvement of the energy density may be achieved. Also, the expansion and contraction of the particle associated with the intercalation and desorption of a lithium ion are sufficiently absorbed by the carbon matrix so that the decrease in the capacity maintaining rate due to the expansion and contraction of the anode active material may be restrained.

In embodiments, the average diameter of the particle is usually 11 nm or less, preferably 10 nm or less, and more preferably 9 nm or less. Also, the average particle diameter of the particle is 1 nm or more, for example. The average particle diameter of the particle is within the above noted range so that the expansion and contraction associated with the intercalation and desorption of a lithium ion are reduced and thus the change in the volume may be small. Consequently, the decrease in the capacity maintaining rate due to the expansion and contraction of the anode active material may be restrained.

Incidentally, examples of the methods for measuring the average particle diameter of the particle may include a method in which diameters of ten particles are measured by using an energy dispersion type X-ray analyzer (TEM-EDX), and then the average of the ten diameters is calculated. Also, the average particle diameter of the particle may be controlled by adjusting the time for performing mechanical milling such as ball mill.

Examples of the shape of the particle in the present disclosure may include a ball shape such as a spherical shape, and an oval spherical shape.

(3) Lithium Oxide

The surface of the first anode active material in the present disclosure is preferably coated with a lithium oxide. The interface between the first anode active material and the solid electrolyte material contained in the anode mixture is a solid-to-solid interface so that mutual diffusion of the constituent elements occurs, and thus the first anode active material occasionally reacts with the solid electrolyte material. In this case, a possible problem is that the reaction with a lithium ion inside the first anode active material is inhibited and thus the capacity is decreased. On the other hand, in the present disclosure, the surface of the first anode active material may be coated with the lithium oxide so that the mutual diffusion of the constituent elements at the solid-to-solid interface between the first anode active material and the solid electrolyte material may be restrained. Therefore, the reaction with a lithium ion inside the first anode active material may be performed well and the effect of restraining the decrease in the capacity is achieved.

The lithium oxide to be used is not particularly limited if the material is capable of coating the surface of the first anode active material. Examples of the lithium oxide to be used in the present disclosure may include the lithium oxides represented by the general formula $Li_xAO_y$ (provided that A is B, C, Al, Si, P, S, Ti, Zr, Nb, Mo, Ta or W; and "x" and "y" are a positive number), and particular examples may include $Li_3PO_4$, $Li_3BO_3$, $Li_4SiO_4$, $LiNbO_3$, $LiAlO_2$.

In the case the surface of the first anode active material is coated with the lithium oxide, the amount of coverage of the surface of the first anode active material with the lithium oxide is not particularly limited if the coverage is in the level that restrains the reaction between the first anode active material and the solid electrolyte material and in the level that allows the reaction with the lithium ion inside the first anode active material to be performed well. Specifically, the coating coverage is preferably 70% or more, preferably 80% or more, and more preferably 90% or more. Incidentally, the coating coverage of the lithium oxide on the surface of the first anode active material may be measured by using a transmission electron microscope (TEM) and X-ray photoelectron spectrometry (XPS), for examples.

Also, in the case the surface of the first anode active material is coated with the lithium oxide, the thickness of the lithium oxide on the surface of the first anode active material is not particularly limited if the thickness is in the level that restrains the reaction between the first anode active material and the solid electrolyte material and in the level that allows the reaction with the lithium ion inside the first anode active material to be performed well. The thickness is preferably within a range of 0.1 nm to 100 nm, for example, and preferably within a range of 1 nm to 20 nm. The thickness of the lithium oxide within the above noted range so that it is possible to restrain the reaction between the first anode active material and the solid electrolyte material effectively, and also, it is possible to restrain the decrease in the ion conductivity. Incidentally, the thickness of the lithium oxide on the surface of the first anode active material may be measured by using a transmission electron microscope (TEM), for example.

2. Second Anode Active Material

The second anode active material in the present disclosure is a carbon material contained in the anode mixture.

The second anode active material in the present disclosure is not particularly limited if the material includes a carbon material and allows the intercalation and desorption of a lithium ion and the expansion and contraction rate of the second anode active material is preferably lower than the rate of the above described first anode active material. The reason is because the expansion and contraction of the first anode active material associated with the intercalation and desorption of a lithium ion is absorbed by the second anode active material so that the expansion and contraction volume as the anode mixture may be restrained. Examples of the carbon materials to be used for the second anode active material may include graphite, mesocarbon microbeads (MCMB), and highly oriented pyrolytic graphite (HOPG), and above all, graphite is preferably used. Graphite has advantages that the expansion and contraction due to the intercalation and desorption of a lithium ion is small, and the stress resistance is large.

The average particle diameter of the second anode active material in the present disclosure is preferably 50 μm or less, and above all, preferably 30 μm or less, and particularly preferably 15 μm or less. Also, the average particle diameter of the second anode active material in the present disclosure is preferably 2 μm or more. The average particle diameter of the second anode active material is within the above noted range so that the expansion and contraction volume of the second anode active material may be decreased and thus the contact between the anode active material layer and the solid electrolyte layer, constituted with the anode mixture, at the interface is easily maintained. Consequently, high energy density and capacity maintaining rate of a battery may be achieved.

Incidentally, the methods for measuring and controlling the average particle diameter of the above described second anode active material may be the same as the methods for the above described first anode active material.

3. Solid Electrolyte Material

The solid electrolyte material in the present disclosure is a material contained in the anode mixture.

The solid electrolyte material is not particularly limited if the material has lithium ion conductivity, but examples thereof may include a sulfide solid electrolyte material, an oxide solid electrolyte material, a nitride solid electrolyte material, and a halide solid electrolyte material; and preferably a sulfide solid electrolyte material. The reason a sulfide electrolyte material is preferred is because the lithium ion conductivity is high when compared with an oxide solid electrolyte material.

Examples of the sulfide solid electrolyte material may include $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$ $B_2S_3$, $Li_2S$—$P_2S_5$—$Z_mS_n$ (provided that "m" and "n" is a positive number; Z is either one of Ge, Zn or Ga), $Li_2S$—$GeS_2$, $Li_2S$—$SiS_2$—$Li_3PO_4$, and $Li_2S$—$SiS_2$—$Li_xMO_y$ (provided that "x" and "y" is a positive number; M is either one of P, Si, Ge, B, Al, Ga, or In). Incidentally, the description '$Li_2S$—$P_2S_5$' denotes a sulfide solid electrolyte material comprising raw composite materials containing $Li_2S$ and $P_2S_5$, and the same is applied to the other descriptions.

Also, in the case the sulfide solid electrolyte material is $Li_2S$—$P_2S_5$ based, the ratio of $Li_2S$ and $P_2S_5$ is preferably within a range of $Li_2S:P_2S_5$=50:50 to 100:0 at mass ratio, and preferably is $Li_2S:P_2S_5$=75:25.

On the other hand, examples of the oxide solid electrolyte material may include NASICON type oxide, garnet type oxide, and perovskite type oxide. Examples of the NASICON type oxide may include an oxide containing Li, Al, Ti, P and O (such as $Li_{1.5}Al_{0.5}Ti_{1.5}(PO_4)_3$), and an oxide containing Li, Al, Ge, P and O (such as $Li_{1.5}Al_{0.5}Ge_{1.5}(PO_4)_3$). Examples of the garnet type oxide may include an oxide containing Li, La, Zr and O (such as $Li_7La_3Zr_2O_{12}$). Examples of the perovskite type oxide may include an oxide containing Li, La, Ti and O (such as $LiLaTiO_3$).

The solid electrolyte material in the present disclosure may be crystalline, amorphous, or glass ceramics (crystallized glass).

Examples of the shape of the solid electrolyte material in the present disclosure may include a particle shape. Also, the average particle diameter ($D_{50}$) of the solid electrolyte material is preferably within a range of 0.01 μm to 40 μm for example, and more preferably within a range of 0.1 μm to 20 μm. The Li ion conductivity of the solid electrolyte material at 25° C. is preferably $1 \times 10^{-5}$ S/cm or more for example, more preferably $1 \times 10^{-4}$ S/cm or more, and particularly preferably $1 \times 10^{-3}$ S/cm or more.

4. Anode Mixture

In embodiments, the anode mixture includes the above described first anode active material, second anode active material, and solid electrolyte material. Also, the ratio (in percent) of the first anode active material relative to a total of the first anode active material and the second anode active material is usually 20% by weight or more, preferably 30% by weight or more, and more preferably 40% by weight or more. Also, in the present disclosure, the ratio of the first anode active material relative to a total of the first anode active material and the second anode active material is usually 90% by weight or less and preferably 80% by weight or less.

Also, the anode mixture in the present disclosure may contain materials other than the above described first anode active material, second anode active material and solid electrolyte material, as required. Examples of the other materials may include a conductive material and a binder.

Examples of the conductive material may include acetylene black (AB), Ketjen black (KB), carbon fiber (VGCF), carbon nano tube (CNT), and carbon nano fiber (CNF). Examples of the binder may include fluoride containing binder such as polyvinylidene fluoride (PVdF) and polytetrafluoroethylene (PTFE), butylene rubber (BR), and styrene-butadiene rubber (SBR).

B. All-Solid Battery

The all-solid battery in the present disclosure features the configuration that has the anode active material layer containing the above described anode mixture. The all-solid battery in the present disclosure is hereinafter explained with reference to the drawings.

Figure 2:
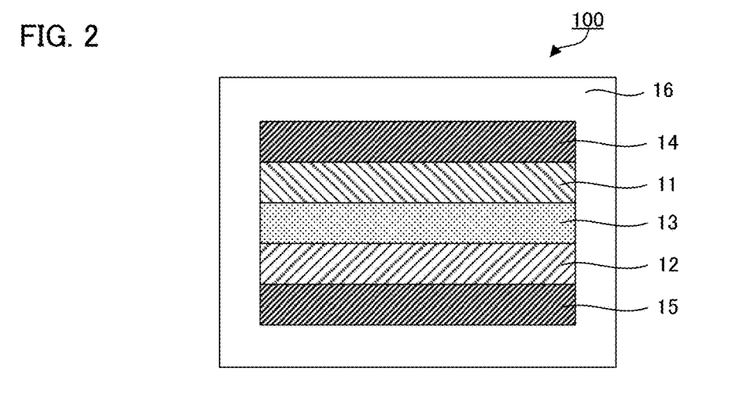
FIG. 2 is a schematic cross-sectional view illustrating an example of the all solid battery of the present disclosure.

FIG. 2 is a schematic cross-sectional view illustrating an example of the all-solid battery in the present disclosure. The all-solid battery 100 shown in FIG. 2 has a cathode active material layer 11, an anode active material layer 12, a solid electrolyte layer 13 formed between the cathode active material layer 11 and the anode active material layer 12, a cathode current collector 14 for collecting current from the cathode active material layer 11, an anode current collector 15 for collecting current from the anode active material layer 12, and a battery case 16 for storing these members. In the all-solid battery 100 of the present disclosure, the anode active material layer 11 has the above described anode mixture. The all solid battery of the present disclosure is hereinafter explained in each constitution.

1. Anode Active Material Layer

The anode active material layer to be used for the all-solid battery is a layer including the anode mixture of the present disclosure. Incidentally, the anode mixture in the present disclosure may include the same contents as the description in the above described section 'A. Anode mixture'; therefore, the description herein is omitted.

The thickness of the anode active material layer varies with the constitutions of the intended all-solid batteries, but is preferably within a range of 0.1 μm to 1000 μm, for example.

Incidentally, the anode active material layer in the present disclosure is, usually, a layer in which the anode mixture described in the section 'A. Anode mixture' above is used. Examples of the methods for forming the anode active material layer using the anode mixture may include a method in which the anode mixture is disposed on one surface of the solid electrolyte material layer and then pressed.

Also, in the present disclosure, the anode active material layer comprises an anode mixture, and the anode mixture may provide an anode active material layer comprising: a first anode active material, a second anode active material, and a solid electrolyte material; wherein the first anode active material is an active material having a carbon matrix and a particle containing Si or Sn dispersed into the carbon matrix; an average particle diameter of the first anode active material is 15 μm or less; a content of the carbon matrix in the first anode active material is 15% by weight or more and 65% by weight or less; a content of the particle in the first anode active material is 35% by weight or more and 85% by weight or less; an average particle diameter of the particle is 11 nm or less; and the second anode active material is a carbon material; and a ratio of the first anode active material relative to a total of the first anode active material and the second anode active material is 20% by weight or more and 90% by weight or less.

2. Cathode Active Material Layer

The cathode active material layer to be used in the all solid battery is a layer containing at least a cathode active material, and may contain at least one of a solid electrolyte material, a conductive material, and a binder, as required.

The cathode active material may be the same as the material used for a cathode active material layer in a general all-solid battery, and not particularly limited.

Examples of the cathode active material may include lithium cobalt oxide ($LiCoO_2$), lithium nickel oxide ($LiNiO_2$), $LiNi_{1/3}Mn_{1/3}Co_{1/3}O_2$, lithium manganese oxide ($LiMn_2O_4$), different kind element substituent Li—Mn spinel represented by $Li_{1+x}Mn_{2-x-y}M_yO_4$ (x+y=2, M is at least a kind selected from Al, Mg, Co, Fe, Ni, and Zn), lithium titanate (oxide including Li and Ti), lithium metal phosphate ($LiMPO_4$, M is at least a kind selected from Fe, Mn, Co, and Ni), transition metal oxide (such as vanadium oxide $V_2O_5$ and molybdenum oxide $MoO_3$), titanium sulfide ($TiS_2$), carbon materials (such as graphite and hard carbon), lithium cobalt nitride (LiCoN), lithium silicon oxide (oxide including Li and Si), lithium metal (Li), a lithium alloy (such as LiM; M is Sn, Si, Al, Ge, Sb, P, for example), lithium-storable intermetallic compound (such as intermetallic compound with storability including Mg and M; M is an intermetallic compound with storability including Sn, Ge, Sb, for example, and an intermetallic compound with storability including N and Sb; N is In, Cu, Mn, for example) and the derivatives for these.

The cathode active material layer in the present disclosure may further contain a conductive material. Addition of a conductive material may improve the conductance of the cathode active material layer. Examples of the conductive material may include acetylene black, Ketjen black, carbon materials such as carbon fiber, and metal materials.

Also, the cathode active material layer may contain a conductive material and a binder other than the cathode active material. Examples of the conductive material may include acetylene black (AB), Ketjen black (KB), carbon fiber (VGCF), carbon nano tube (CNT), and carbon nano fiber (CNF). Examples of the binder may include fluoride containing binder such as polyvinylidene fluoride (PVdF) and polytetrafluoroethylene (PTFE), butylene rubber (BR), and styrene-butadiene rubber (SBR).

The thickness of the cathode active material layer varies with the constitutions of the intended all solid batteries, but is preferably within a range of 0.1 μm to 1000 μm, for example.

3. Solid Electrolyte Layer

The solid electrolyte layer to be used for the all-solid battery is a layer formed between the cathode active material layer and the anode active material layer, and is a layer containing at least a solid electrolyte material. Lithium ion conduction between the cathode active material and the anode active material may be performed by the intermediary of the solid electrolyte material contained in the solid electrolyte layer.

The solid electrolyte material is not particularly limited if the material has a lithium ion conductivity, but the examples may include a sulfide solid electrolyte material, an oxide solid electrolyte material, a nitride sol id electrolyte material, and a halide solid electrolyte material, and above all, a sulfide solid electrolyte material is preferable. The reason is because the lithium ion conductivity is high when compared with an oxide solid electrolyte material. Incidentally, a sulfide solid electrolyte material has higher reactivity than that of an oxide solid electrolyte material, so that easily reacts with the cathode active material and a high resistive layer is easily formed in between the cathode active material. Incidentally, specific sulfide solid electrolyte material and oxide solid electrolyte material may be in the same contents as the description in the section 'A. Anode mixture 3. Solid electrolyte material' above; therefore the description herein is omitted.

The thickness of the solid electrolyte layer is not particularly limited, but preferably within a range of 0.1 μm to 1000 μm, for example, and more preferably within a range of 0.1 μm to 300 μm.

4. Other Constitutions

The all solid battery in the present disclosure has at least the above described cathode active material layer, anode active material layer, and solid electrolyte layer. Further, the all solid battery usually has a cathode current collector for collecting currents of the cathode active material layer, and an anode current collector for collecting currents of the anode active material layer. Also, in terms of the battery case to be used in the present disclosure, a battery case for a general lithium battery may be used.

5. All-Solid Battery

The all-solid battery in the present disclosure may be a primary battery or a secondary battery, but preferably a secondary battery. The reason is because the secondary battery may be repeatedly charged and discharged and is useful as a battery mounted on a vehicle, for example. Examples of the shape of the all-solid battery in the present disclosure may include a coin shape, a laminate shape, a cylindrical shape and a rectangular shape. Also, in the present disclosure, the all-solid battery may be an all-solid lithium ion battery.

Incidentally, the present disclosure is not limited to the embodiments. The embodiments are exemplifications, and any is included in the technical scope of the present disclosure if it has substantially the same constitution as the technical idea described in the claim of the present disclosure and offers similar operation and effect thereto.

EXAMPLES

The present disclosure is hereinafter described in more details by showing examples.

(Synthesis of the Solid Electrolyte Material)

As the starting materials, lithium sulfide ($Li_2S$, Nippon Chemical Industrial Co., Ltd.) and phosphorus pentasulfide ($P_2S_5$, Sigma-Aldrich Japan K.K.) were used. Next, $Li_2S$ (0.7656 g) and $P_2S_5$ (1.2344 g) were weighed in a glove box which was under Ar atmosphere (dew point: −70° C.) so as to have a molar ratio of 75 $Li_2S$.25 $P_2S_5$ ($Li_3PS_4$, ortho composition). Next, this mixture was mixed by an agate mortar for 5 minutes, and then put into the vessel of a planetary ball mill (45 cc, made of $ZrO_2$), dehydrated heptane (moisture content of 30 ppm or less, 4 g) was put into the vessel, and $ZrO_2$ balls ($\phi$=5 mm, 53 g) were further put into the vessel, and the vessel was hermetically sealed completely (Ar atmosphere). This vessel was mounted on the planetary ball mill machine (P7™ manufactured by FRITSCH JAPAN CO, LTD.) and subjected to mechanical milling treatment for 40 hours. After that, the obtained test sample was dried on a hot plate to remove heptane, and the solid electrolyte material ($Li_3PS_4$) was obtained.

(Preparation for Anode Mixture)

Si powder and acetylene black (a carbon material) were weighed and put into a vessel, mounted on the planetary ball mill machine (P7™ manufactured by FRITSCH JAPAN CO, LTD.) and subjected to mechanical milling treatment for 32 hours. After that, coarse particles were removed through a sieve (mesh size: 20 μm) to obtain the first anode active material. Next, the surface of the first anode active material was coated with lithium oxide by the pulse laser deposition method. In specific, the first anode active material was set on an oscillating surface, the laser was oscillated so as to target the lithium oxide ($Li_3PO_4$), and the surface of the first anode active material was coated with the lithium oxide. After that, the obtained first anode active material, a graphite material as the second anode active material, and the above described solid electrolyte material were weighed and sufficiently mixed to obtain an anode mixture.

(Preparation for Cathode Mixture)

A layer of $LiNbO_3$ (a coating layer) was formed on the surface of $LiNi_{3/5}Co_{1/5}Mn_{1/5}O_2$ (an active material) by spray-coating method using a tumbling fluidized bed coating apparatus (SFP-01™, manufactured by Powrex Corp.) to produce a cathode active material. The weight of 12.03 mg of the obtained cathode active material, 0.51 mg of vapor growth carbon fiber (VGCF™ (registered trademark)) as a conductive material, and 5.03 mg of the above described solid electrolyte material were weighed and sufficiently mixed to obtain the cathode mixture.

Examples 1 to 18

The above described solid electrolyte material was weighed so as to be 18 mg in a 1 $cm^2$ mold which was made of ceramics, and then pressed at 1 ton/$cm^2$ to produce a solid electrolyte layer, and 18.6 mg of the above described cathode mixture was put onto one side of the solid electrolyte layer and pressed at 1 ton/$cm^2$ to obtain a cathode active material layer. Next, the above described anode mixture was put onto the opposite side of the solid electrolyte layer and pressed at 1 ton/$cm^2$ to obtain an anode active material layer. Incidentally, an aluminum foil was used for the cathode current collector and a copper foil was used for the anode current collector. Also, the amount of the first anode active material and the second anode active material contained in the anode mixture are as shown in Tables 1 to 3. For example, the anode mixture in Example 3 was obtained by weighing 5.14 mg of the first anode active material, 3.42 mg of a graphite material as the second anode active material, and 8.24 mg of the above described solid electrolyte material, and sufficiently mixing these. Further, the weight of the anode mixture was 10.2 mg in Example 3, and the weight was accordingly changed in Examples 1, 2, and 4 to 18. An all-solid battery was obtained by the aforementioned procedure.

Comparative Example 1

An all-solid battery was obtained in the same manner as in Examples 1 to 18 except that 9.06 mg of a graphite material and 8.24 mg of the solid electrolyte material were weighed and sufficiently mixed to obtain an anode mixture, and 17.3 mg of the anode mixture was put onto the opposite side of the side where the cathode active material layer was formed in the solid electrolyte layer, and then pressed at 1 ton/$cm^2$ to obtain an anode active material layer.

Comparative Examples 2 to 16

An all-solid battery was obtained in the same manner as Examples 1 to 18 except that the first anode active material, a graphite material for the second anode active material, and the above described solid electrolyte material were weighed so as to be the content shown in Tables 1 to 3 and sufficiently mixed to obtain an anode mixture.

[Evaluation]

The capacity maintaining rate and the cell volume energy density with regard to the all solid batteries in Examples and Comparative Examples were evaluated.

First cycle: The all solid battery was CC/CV charged up to 4.4 V at 0.35 mA, and then CC/CV discharged down to 3.0 V at 0.35 mA.

Second to 500th cycles: The all solid battery was CC charged up to 4.4 V at 1.8 mA, and then CC discharged down to 3.0 V at 0.3 mA.

501th cycle: The all solid battery was CC/CV charged up to 4.4 V at 0.35 mA, and then CC/CV discharged down to 3.0 V at 0.3 mA.

The capacity maintaining rate was calculated by dividing the discharge capacity of the 501th cycle by the discharge capacity of the first cycle. Also, the charge and discharge capacity was measured by charging and discharging the all-solid battery under the above described condition, and then the cell volume energy density was measured from the capacity.

Figure 3:
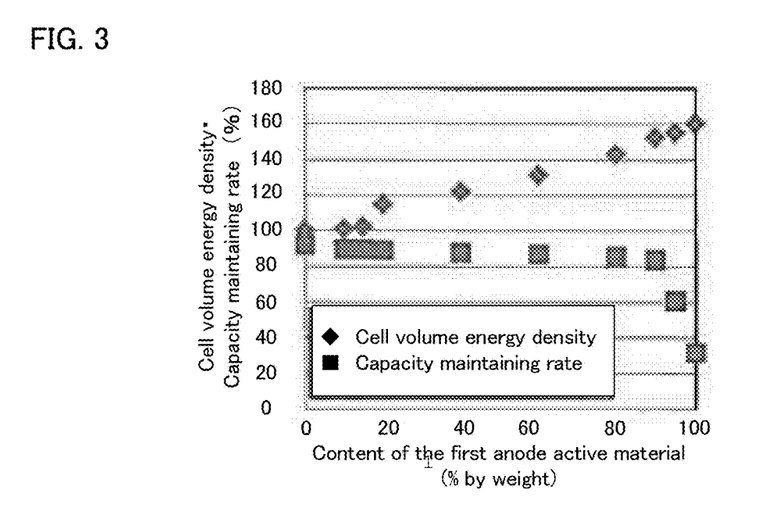
FIG. 3 is a graph showing the cell volume energy density and the capacity maintaining rate to the content of the first anode active material in Examples 1 to 5 and Comparative Examples 1 to 5.

First, the cell volume energy density and the capacity maintaining rate were evaluated by adjusting the contents of the first anode active material and the second anode active material in the anode mixture (Examples 1 to 5, Comparative Examples 1 to 5). The results are shown in Table 1 and FIG. 3.

anode active material. Also, the reason therefor is conceived to be that the expansion and contraction of the whole anode having the anode mixture may be restrained by the second anode active material so that the condition in which the anode active material and the solid electrolyte material are in contact at the interface is maintained, and thus the lithium ion conduction path may be secured. Incidentally, the cell volume energy density is the rate when setting the result of Comparative Example 1 to be 100. Also, the contents of the carbon matrix and the particles here are equivalent to the prepared amount at the time of the synthesis.

TABLE 1

|  | Anode Mixture ||||||| Evaluation Result ||
|  | First Anode Active Material ||||| Second Anode |||
|  | | | Carbon | Particle || | Active | | |
|  | Content (% by weight) | Average Particle Diameter (μm) | Matrix Content (% by weight) | Content (% by weight) | Average Particle Diameter (nm) | Coating with Lithium Oxide | Material Content (% by weight) | Cell Volume Energy Density | Capacity Maintaining Rate (%) |
|---|---|---|---|---|---|---|---|---|---|
| Comparative Example 1 | 0 | — | — | — | — | — | 100 | 100 | 92 |
| Comparative Example 2 | 10 | 6 | 30 | 70 | 6 | Present | 90 | 101 | 90 |
| Comparative Example 3 | 15 | | | | | | 85 | 102 | 90 |
| Example 1 | 20 | 6 | 30 | 70 | 6 | Present | 80 | 115 | 89 |
| Example 2 | 40 | | | | | | 60 | 122 | 88 |
| Example 3 | 60 | | | | | | 40 | 131 | 87 |
| Example 4 | 80 | | | | | | 20 | 143 | 86 |
| Example 5 | 90 | | | | | | 10 | 152 | 84 |
| Comparative Example 4 | 95 | 6 | 30 | 70 | 6 | Present | 5 | 155 | 61 |
| Comparative Example 5 | 100 | | | | | | 0 | 160 | 32 |

From the results shown in Table 1 and FIG. 3, the contents of the first anode active material and the second anode active material in the anode mixture were set to be within the predetermined range so that the cell volume energy density was improved while maintaining the capacity maintaining rate. The reason therefor is conceived to be that the content of the second anode active material was set to be within the predetermined range so that the expansion and contraction of the particles associated with the intercalation and desorption of a lithium ion may be absorbed by the second Next, the cell volume energy density and the capacity maintaining rate were evaluated by adjusting the contents of the carbon matrix and the particles contained in the first anode active material in the anode mixture, and by further adjusting the average particle diameter of the particles (Examples 6 to 10, Comparative Examples 6 to 10). The results are shown in Table 2 and FIG. 4.

TABLE 2

|  | Anode Mixture ||||||| Evaluation Result ||
|  | First Anode Active Material ||||| Second Anode |||
|  | | | Carbon | Particle || | Active | | |
|  | Content (% by weight) | Average Particle Diameter (μm) | Matrix Content (% by weight) | Content (% by weight) | Average Particle Diameter (nm) | Coating with Lithium Oxide | Material Content (% by weight) | Cell Volume Energy Density | Capacity Maintaining Rate (%) |
|---|---|---|---|---|---|---|---|---|---|
| Comparative Example 6 | 60 | 6 | 95 | 5 | 5 | Present | 40 | 100 | 92 |
| Comparative Example 7 | | | 90 | 10 | 6 | | | 101 | 91 |
| Comparative Example 8 | | | 80 | 20 | 6 | | | 103 | 91 |
| Example 6 | 60 | 6 | 65 | 35 | 6 | Present | 40 | 113 | 90 |
| Example 7 | | | 50 | 50 | 6 | | | 120 | 89 |
| Example 8 | | | 30 | 70 | 6 | | | 131 | 87 |
| Example 9 | | | 20 | 80 | 7 | | | 136 | 84 |
| Example 10 | | | 15 | 85 | 7 | | | 146 | 81 |
| Comparative Example 9 | 60 | 6 | 10 | 90 | 10 | Present | 40 | 130 | 20 |
| Comparative Example 10 | | | 0 | 100 | — | | | 128 | 10 |

Figure 4:
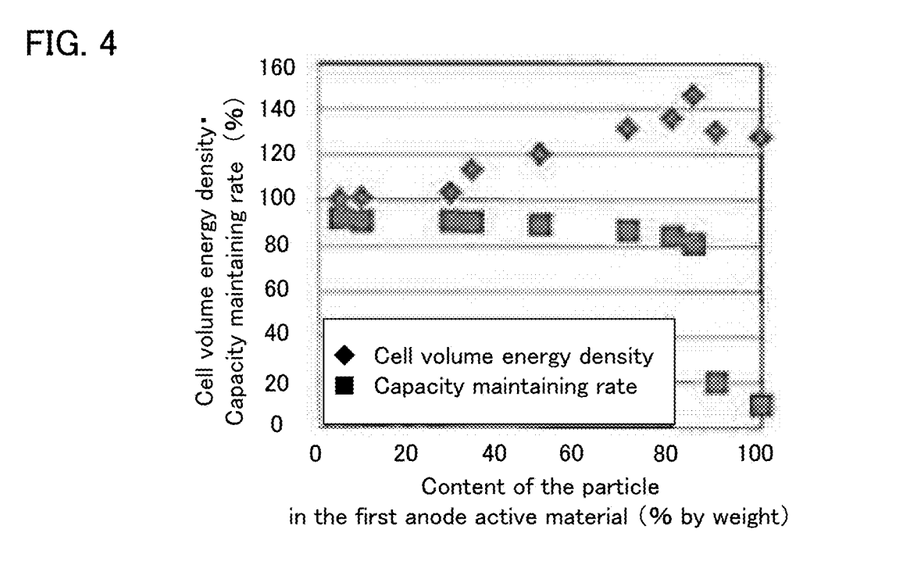
FIG. 4 is a graph showing the cell volume energy density and the capacity maintaining rate to the content of the particle in the first anode active material in Examples 6 to 10 and Comparative Examples 6 to 10.

From the results shown in Table 2 and FIG. 4, the contents of the carbon matrix and the particle in the first anode active material in the anode mixture were set to be within the predetermined range, and thus the cell volume energy density was improved while maintaining the capacity maintaining rate. The reason therefore is conceived to be that the contents of the carbon matrix and the particles in the first anode active material were set to be within the predetermined range so that the expansion and contraction of the particles associated with the intercalation and desorption of a lithium ion were sufficiently absorbed by the carbon matrix. Incidentally, the cell volume energy density is the rate when the result of Comparative Example 1 is set to be 100. Also, the contents of the carbon matrix and the particles here are equivalent to the prepared amount at the time of the synthesis. Further, silicon powder was used as the particle in Comparative Example 10.

Figure 5:
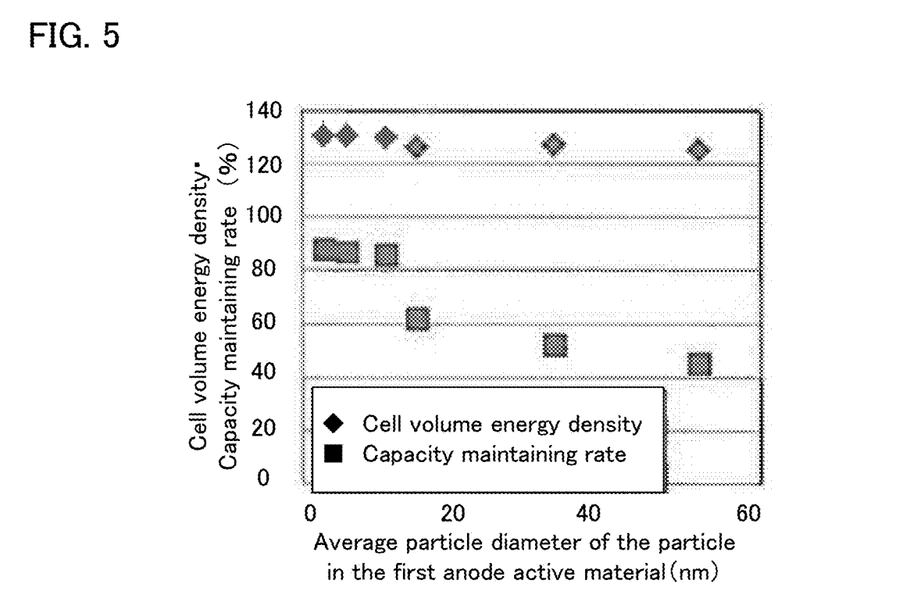
FIG. 5 is a graph showing the cell volume energy density and the capacity maintaining rate to the average particle diameter of the particle in the first anode active material in Examples 11 to 18 and Comparative Examples 11 to 16.
Figure 6:
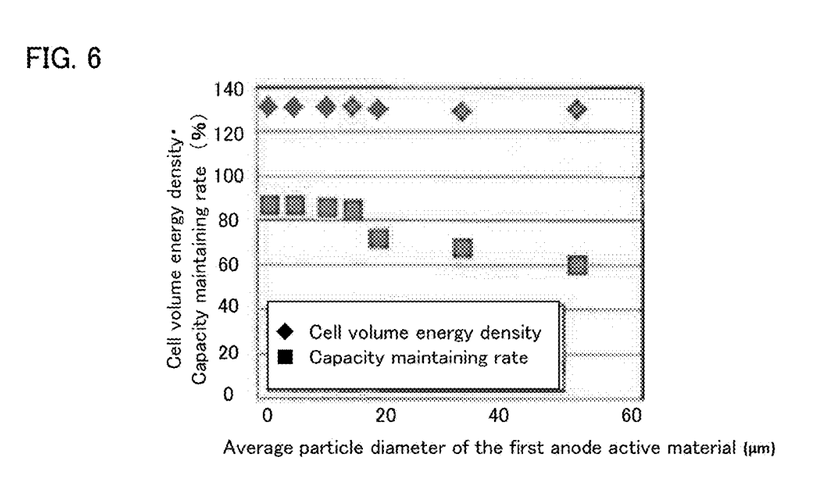
FIG. 6 is a graph showing the cell volume energy density and the capacity maintaining rate to the average particle diameter of the first anode active material in Examples 11 to 18 and Comparative Examples 11 to 16.

Next, the cell volume energy density and the capacity maintaining rate were evaluated by adjusting the average particle diameters of the particles contained in the first anode active material in the anode mixture, and adjusting the average particle diameter of the first anode active material, and by further adjusting the presence or absence of the lithium oxide coating on the surface of the first anode active material (Examples 11 to 18, Comparative Examples 11 to 16). The results are shown in Table 3, FIGS. 5 and 6.

thus the condition in which the anode active material and the solid electrolyte material are in contact at the interface may be maintained. Incidentally, the cell volume energy density is the rate when the result of Comparative Example 1 is set to be 100. Also, the contents of the carbon matrix and the particle here are equivalent to the prepared amount at the time of the synthesis.

REFERENCE SIGNS LIST 1 first anode active material
1a carbon matrix
1b particle
2 second anode active material
3 solid electrolyte material
10 anode mixture
11 cathode active material layer
12 anode active material layer
13 solid electrolyte layer
100 all solid battery

The invention claimed is:
1. An anode mixture comprising a first anode active material, a second anode active material, and a solid electrolyte material,

TABLE 3

| | Anode Mixture | | | | | | | | |
|---|---|---|---|---|---|---|---|---|---|
| | First Anode Active Material | | | | | | Second Anode Active Material | Evaluation Result | |
| | | | Carbon Matrix | Particle | | | | | |
| | Content (% by weight) | Average Particle Diameter (μm) | Content (% by weight) | Content (% by weight) | Average Particle Diameter (nm) | Coating with Lithium Oxide | Content (% by weight) | Cell Volume Energy Density | Capacity Maintaining Rate (%) |
| Comparative Example 11 | 60 | 6 | 30 | 70 | 52 | Present | 40 | 125 | 45 |
| Comparative Example 12 | | | | | 33 | | | 127 | 52 |
| Comparative Example 13 | | | | | 15 | | | 126 | 62 |
| Example 11 | 60 | 6 | 30 | 70 | 11 | Present | 40 | 130 | 86 |
| Example 12 | | | | | 6 | | | 131 | 87 |
| Example 13 | | | | | 3 | | | 131 | 88 |
| Example 14 | | | | | 6 | Not Present | | 130 | 84 |
| Comparative Example 14 | 60 | 50 | 30 | 70 | 6 | Present | 40 | 130 | 60 |
| Comparative Example 15 | | 32 | | | | | | 129 | 68 |
| Comparative Example 16 | | 19 | | | | | | 130 | 72 |
| Example 15 | 60 | 15 | 30 | 70 | 6 | Present | 40 | 131 | 85 |
| Example 16 | | 11 | | | | | | 131 | 86 |
| Example 17 | | 6 | | | | | | 131 | 87 |
| Example 18 | | 2 | | | | | | 131 | 87 |

From the results shown in Table 3 and FIG. 5, it was found out that the average particle diameter of the particles in the first anode active material in the anode mixture was set to be within the predetermined range so that the capacity maintaining rate and the cell volume energy density were improved. Also, it was found out from the results shown in Table 3 and FIG. 6 that the average particle diameter of the first anode active material in the anode mixture was set to be within the predetermined range so that the capacity maintaining rate and the cell volume energy density were improved. The reason therefor is conceived to be that the average particle diameter of the particles were set to be within the predetermined range so that the expansion and contraction rate of the particles associated with the intercalation and desorption of a lithium ion was decreased, and wherein the first anode active material is an active material having a carbon matrix and particles containing Si or Sn dispersed into the carbon matrix, an average particle diameter of the first anode active material is 15 μm or less, a content of the carbon matrix in the first anode active material is 15% by weight or more and 65% by weight or less, a content of the particles in the first anode active material is 35% by weight or more and 85% by weight or less, an average particle diameter of the particles is 11 nm or less, the second anode active material is a carbon material, and a ratio of the first anode active material relative to a total of the first anode active material and the second anode active material is 20% by weight or more and 90% by weight or less.

2. The anode mixture according to claim 1 wherein a surface of the first anode active material is coated with a lithium oxide.

3. An all solid battery comprising an anode active material layer including the anode mixture according to claim 1.

4. The anode mixture according to claim 1 wherein an average particle size of the second anode active material is 50 μm or less.

5. The anode mixture according to claim 1 wherein the solid electrolyte material is a sulfide solid electrolyte material.

* * * * *